UNITED STATES PATENT OFFICE.

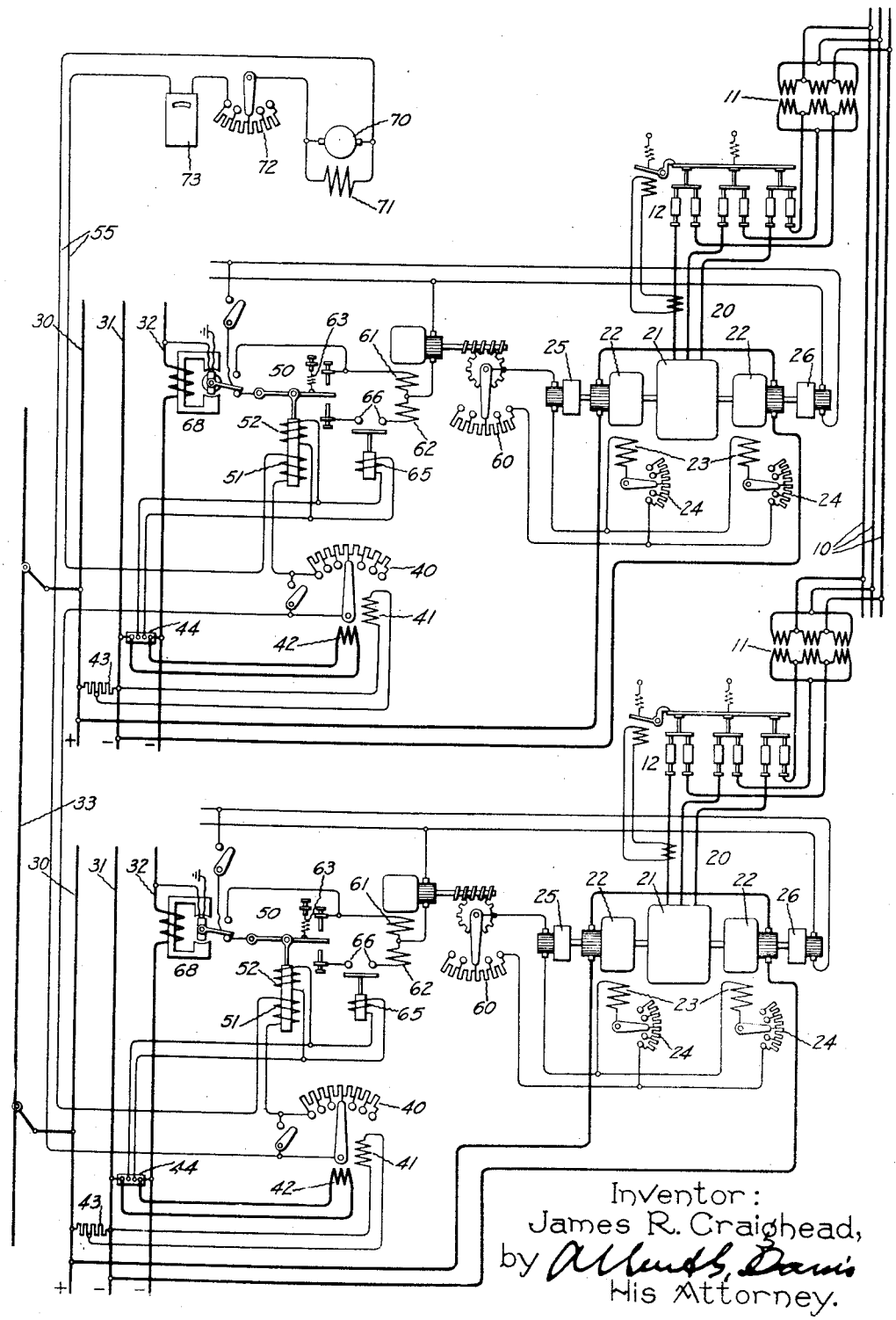

JAMES R. CRAIGHEAD, OF SCHENECTADY, NEW YORK, ASSIGNOR TO GENERAL ELECTRIC COMPANY, A CORPORATION OF NEW YORK.

POWER-LIMITING SYSTEM.

1,350,921.  Specification of Letters Patent.  Patented Aug. 24, 1920.

Application filed January 26, 1920. Serial No. 354,059.

*To all whom it may concern:*

Be it known that I, JAMES R. CRAIGHEAD, a citizen of the United States, residing at Schenectady, in the county of Schenectady, State of New York, have invented certain new and useful Improvements in Power-Limiting Systems, of which the following is a specification.

My invention relates to a system for limiting the power supplied by a plurality of sources to a distribution system.

My invention is especially applicable to direct-current railway systems in which a plurality of sources are adapted to supply power to the system and to receive regenerated power from the system.

My invention is an improvement on the power limiting system shown in Patent No. 1,260,094, issued March 19, 1918, to John B. Taylor and assigned to the General Electric Company. According to the system there described, when the total power supplied to the distribution system by the plurality of sources reaches a predetermined value the voltage of each source is lowered and there is a tendency to reduce first the voltage of the sources which are carrying the heaviest loads. It has been found that if the load rises suddenly to a point considerably in excess of the limit which the system is adjusted to maintain, a lowering of the voltage takes place, not only of all the sources supplying power to the system but also of any source which may be receiving power from the distribution system due to regeneration from trains operating down a near grade. This reduction in voltage of the source or sources receiving power from the system causes the amount of regenerated current flowing into the source or sources to increase and it may reach such a large value as to open the circuit breakers or cause bad commutation. The same undesirable results are obtained when a source, the voltage of which is low due to the power limiting system, changes from furnishing power to receiving regenerated power from the system.

The object of my invention is to provide in combination with a distribution system and a plurality of sources adapted to supply power to and receive power from the system, a power limiting system which is adapted to lower the voltage of all the sources supplying power to a distribution system when the total demand on the system exceeds a predetermined amount, and means for preventing the voltage of a source, which is receiving power from the distribution system, from being lowered and for restoring the voltage thereof to a predetermined value, in case the voltage is below the predetermined value.

In accordance with my invention, I provide each source with a reverse current relay which is arranged to control the operation of the power limiting apparatus associated therewith in such a way that when the source is supplying power to the distribution system the relays of the power limiting system are connected to vary the voltage thereof when the total demand exceeds a predetermined amount, and when the source receives regenerated power from the distribution system the connections of the relays of the power limiting system are changed so that the voltage of the source cannot be lowered by the operation of the power limiting apparatus, and if the voltage has already been lowered it will be raised to its normal value when regeneration begins.

For convenience I shall hereafter describe my system as applied to a railway system supplied with power through a plurality of substations in which alternating current power, supplied from a common main source is transformed to direct current which is supplied to the railway system. The term "source" as used in the specification and claims will, in this case, refer to the source of direct current in the substation and not to the main or primary source.

My invention will be better understood from the following description taken in connection with the drawing in which I have diagrammatically illustrated my invention as applied to two substations.

Referring to the drawing, 10 represents incoming lines which are connected to both stations. These lines are connected to a primary source of energy, but it will be evident that separate main sources may be employed for each station. Each substation comprises the usual stepdown transformers 11 and circuit breakers 12 through which power is supplied to a motor-generator set 20. This set is here illustrated as comprising a motor 21 and two generators 22 arranged in series, each of which is provided with the usual field winding 23 and adjustable resistance 24. Mounted on the same shaft with the motor 21 and the generators 22, I have shown an exciter 25 and an auxiliary generator 26. Energy from the direct-current generators 22 is supplied to the positive and negative buses 30 and 31. I have also shown a connection 32 which leads from the negative buses 31 to the track rails and a connection 33 which leads from the positive buses 30 to the trolley or third rail of the railway system.

Associated with each substation and in series with a pilot wire circuit 55 is an automatically operated rheostat 40 which is moved so that the resistance in the circuit 55 is varied in a definite relation to variations in the power supplied and received by the substation. I have shown the rheostat arm as directly controlled by a contact making wattmeter whose windings comprise a potential winding 41 and a current winding 42. This wattmeter is arranged so that when no power is being supplied or received by the source a certain resistance is inserted in the pilot wire circuit and when the source is supplying power this resistance is decreased to bear a definite relation to the amount of power supplied, and when the source is receiving power this resistance is increased to bear a definite relation to the amount of power received, and therefore the current in the pilot wire circuit bears a definite relation to the difference between the power supplied by the plurality of sources and the power received by the sources.

It is obvious, however, that the wattmeter could be arranged to decrease the resistance to bear a definite relation to the amount of power received and to increase the resistance to bear a definite relation to the amount of power supplied, and the current in the pilot wire circuit would still bear a definite relation to the difference between the power supplied by the plurality of sources and the power received by the sources.

Connected between the positive and negative buses 30 and 31 is a high resistance shunt 43 and the potential winding 41 is connected across a suitable portion of this shunt. Between the negative bus 31 and track rail connection 32, is a low resistance shunt 44 and the current winding 42 of the wattmeter is connected across a portion of this shunt.

For the purpose of limiting the power demand on a substation, I supply a current responsive device which may comprise a contact making ammeter 50 having windings 51 and 52 which aid each other in the particular arrangement shown. The winding 51 is connected in series with the pilot wire circuit 55. The other winding 52 is connected in shunt with a suitable portion of the resistance shunt 44 through which the total current supplied by the station is flowing. This current responsive device 50 is arranged in any desired manner to control the field circuits of the generators 22. To this end I have shown a motor operated rheostat 60 whose motor is provided with opposing field windings 61 and 62, whereby it may be driven in one direction or the other, depending upon whether the contact making ammeter 50 touches its upper or lower contact. When a circuit is completed through the armature of the motor and the field winding 61, the motor is operated in a direction to increase the field current of the generators 22 and when a circuit is completed through the armature of the motor and field winding 62 the motor is operated in the opposite direction to decrease the field current of the generators 22. The rheostat is provided with the usual limit switches whereby the motor circuits are automatically opened to stop the motor after all the resistance has been cut in or out of the circuit. These limit switches have been omitted to simplify the drawing. The moving arm of the ammeter is normally held by a spring 63 in engagement with the upper contact and is only drawn down so as to engage the lower contact when the combined currents in the windings 51 and 52 exceed a certain value. Current for operating the motor is supplied from the auxiliary generator 26 through the movable contact of a reverse current relay 68 which is connected in series with the connection 32 leading to the track rails of the railway system. As viewed in the drawing this relay is arranged so that its movable armature is in engagement with its lower contact as long as current is being supplied from the generators 22 to the railway system and only engages its upper contact when current is being supplied from the railway system to the generators 22. In the circuit which connects the lower contact of the ammeter 50 with the field winding 62, I have provided the contacts 66 which are adapted to be bridged by a relay 65. This relay 65 is arranged in parallel with winding 52 of the contact making ammeter and so designed that the circuit through the field winding 62 may be closed only when the current output of the substation has attained a certain value.

The pilot wire circuit 55 is a closed circuit and comprises a constant potential generator 70 provided with a shunt field winding 71, a calibrating rheostat 72 and ammeter 73. Since the current in the pilot wire circuit bears at all times a definite relation to the difference between the total power supplied by the plurality of sources, and the power supplied by the sources, the ammeter 73, if properly calibrated, indicates the total net demand on all the substations. The calibrating resistance 72 is provided in order that I may compensate the variations in temperature and consequent changes in the resistance of the pilot wire circuit. It will be understood that the constant potential generator 70, the calibrating resistance 72 and the ammeter 73, are preferably located at a train despatcher's office.

The operation of my system is as follows:

Let is be assumed that the motor generator sets 20 are in operation and the generators 22 are connected to the trolley and track rails of the railway system and that the pilot wire 55 is supplied with current from the constant potential generator 70. Since the automatically operated rheostats 40 are arranged to vary the resistance of the pilot circuit in a definite relation to the power being supplied and received by the responsive stations the current in the pilot wire circuit bears a definite relation to the total net demand on all the sources. When the current in the pilot wire circuit exceeds a predetermined value, thus indicating that the total power supplied to the railway system by the plurality of sources exceeds the total regenerated power by more than a predetermined amount, and therefore that the net demand is excessive, the winding 51 of each current responsive device 50 is sufficiently energized to move the current responsive device into engagement with its lower contact, whereupon a circuit is completed for the motor operated rheostat 60 through the field winding 62 to decrease the excitation of the generators 22. The direct current voltage of the railway system is thereby regulated until the excessive demand has ceased. In order to first decrease the excitation of those generators which are carrying the heaviest loads, I provide the additional winding 52 placed in multiple with the shunt 44 to assist the winding 51. As a further precaution and means for accomplishing a similar result, I also provide relay 65 whereby the current responsive device 50 cannot operate to decrease the excitation of the generators 22 until the current output of the station reaches a certain definite value sufficient to operate the relay 65. This relay also serves to prevent the excitation from being decreased at a substation if it is lightly loaded, even though the total load has exceeded the predetermined value.

As stated above, it is desirable not to lower the voltage of the generators which are receiving regenerated power and to accomplish this result, I have provided the reverse current relays 68. When regenerated current begins to flow into a substation, the reverse current relay 68 is operated and disconnects the auxiliary generator 26 from the movable contact of the current responsive device 50 and completes a circuit which includes the field winding 61 for restoring the motor operated rheostat 60 to its maximum voltage position if it is not already there. Since the circuit is broken between the auxiliary generator 26 and the movable contact of the current responsive device 50 the operation of the current responsive device does not affect the operation of the motor operated rheostat 60 as long as regeneration continues.

Various modifications of my invention other than that illustrated may be made and therefore, I do not desire to be limited to the particular arrangement herein described and shown but seek to cover in the appended claims all modifications which do not depart from the spirit and scope of my invention.

What I claim as new and desire to secure by Letters Patent of the United States, is:—

1. In combination, a distribution circuit, a plurality of sources of electric energy adapted to supply power to said circuit and to receive power from said circuit, and a power limiting system comprising means associated with each source and controlled by the total demand on all of said sources for varying the voltage thereof, and means for rendering the voltage varying means associated with a source inoperative to decrease the voltage thereof when said source is receiving power from said circuit.

2. In combination, a distribution circuit, a plurality of sources of electric energy adapted to supply power to said circuit and to receive power from said circuit, and a power limiting system comprising means associated with each source and controlled by the total demand on all of said sources for varying the voltage thereof, and means for rendering the voltage varying means associated with a source inoperative to decrease the voltage thereof when said source is receiving power from said circuit and for restoring the voltage of said source to a predetermined normal value.

3. In combination, a distribution circuit, a plurality of sources of electric energy adapted to supply power to said circuit and to receive power from said circuit, and a power limiting system comprising means associated with each source and controlled by the total demand on all of said sources for varying the voltage thereof, and means controlled by the direction of the current between a source and said circuit for rendering the voltage varying means associated with said source inoperative to decrease the voltage thereof when said source is receiving power from said circuit.

4. In combination, a distribution circuit, a plurality of dynamo electric machines adapted to supply power to said circuit and to receive power from said circuit, and a power limiting system comprising means controlled by the total power supplied to said circuit by said machines for increasing the resistance of the field circuits of said machines to decrease the voltage thereof and means controlled by the direction of current between a machine and said circuit for rendering inoperative the means associated with said machine for increasing the resistance in the field circuit when said machine is receiving power from said circuit.

5. In combination, a distribution circuit, a plurality of dynamo electric machines adapted to supply power to said circuit and to receive power from said circuit, and a power limiting system comprising a motor operated rheostat connected to the field circuit of each machine, means controlled by the total power supplied to said circuit by said machines for controlling the motor circuits of said rheostats, and means controlled by the direction of current between a machine and said distribution circuit for disconnecting the control of the motor operated rheostat associated with said machine from said total power responsive means and completing a circuit for said motor operated rheostat to restore and maintain said rheostat in its maximum voltage position when said machine is receiving power from said circuit.

6. In combination, a distribution circuit, a plurality of dynamo electric machines adapted to supply power to said circuit and to receive power from said circuit, and a power limiting system comprising a motor operated rheostat connected to the field circuit of each machine, a pilot circuit associated with said sources, means for controlling the current in said pilot circuit in a definite relation to variations in the total power delivered and received by said source, current responsive means in said circuit and arranged to control the circuits of said motor operated rheostats, and a reverse current relay associated with each machine and connected so as to be traversed by the current flowing between the machine and the distribution circuit for disconnecting the motor operated rheostat associated with said machine from the control of the current responsive means and for completing a circuit for the motor operated rheostat to cause it to move to its maximum voltage position when the machine is receiving power from said circuit.

In witness whereof I have hereunto set my hand this 23d day of January, 1920.

JAMES R. CRAIGHEAD.